(12) United States Patent
Hiie et al.

(10) Patent No.: US 9,130,761 B2
(45) Date of Patent: **\*Sep. 8, 2015**

(54) METHOD AND SYSTEM FOR DATA TRANSMISSION

(71) Applicant: Microsoft Corporation, Redmond, WA (US)

(72) Inventors: Magnus Hiie, Tallinn (EE); Ahti Heinla, Tallinn (EE)

(73) Assignee: Skype, Dublin (IE)

( * ) Notice: Subject to any disclaimer, the term of this patent is extended or adjusted under 35 U.S.C. 154(b) by 155 days.

This patent is subject to a terminal disclaimer.

(21) Appl. No.: 13/750,947

(22) Filed: Jan. 25, 2013

(65) Prior Publication Data

US 2013/0142086 A1 Jun. 6, 2013

Related U.S. Application Data

(63) Continuation of application No. 12/660,062, filed on Feb. 19, 2010, now Pat. No. 8,363,661.

(30) Foreign Application Priority Data

Apr. 14, 2009 (GB) .................................. 0906413.0

(51) Int. Cl.
*H04L 12/28* (2006.01)
*H04L 12/56* (2006.01)
(Continued)

(52) U.S. Cl.
CPC ............ *H04L 12/18* (2013.01); *H04L 12/1854* (2013.01); *H04L 67/104* (2013.01); *H04L 67/288* (2013.01); *H04L 67/2814* (2013.01)

(58) Field of Classification Search
CPC ... H04L 12/1854; H04L 67/104; H04L 12/18; H04L 67/288; H04L 67/2814

USPC ......... 370/260–261, 352, 390, 400, 401, 402, 370/252, 315, 432; 709/204, 224, 232
See application file for complete search history.

(56) References Cited

U.S. PATENT DOCUMENTS

| 6,393,466 | B1 | 5/2002 | Hickman et al. |
| 7,111,006 | B2 | 9/2006 | Vange et al. |

(Continued)

FOREIGN PATENT DOCUMENTS

| GB | 2440762 | 2/2008 |
| GB | 2444339 | 6/2008 |

(Continued)

OTHER PUBLICATIONS

"Notice of Allowance", U.S. Appl. No. 12/660,082, (Feb. 25, 2013), 6 pages.

(Continued)

*Primary Examiner* — Chuong T Ho
(74) *Attorney, Agent, or Firm* — Jim Ross; Micky Minhas

(57) ABSTRACT

A method, system and program for transmitting a data stream in a network of interconnectable end-user nodes comprising a source node, a plurality of recipient nodes and a plurality of further nodes, wherein each end-user node executes a communication client application. The method comprises: the source receiving a command to transmit the data stream to the plurality of recipients; selecting from the plurality of further nodes at least one relaying node to relay the data stream between the source node and the plurality of recipients; the source establishing a connection to the at least one relaying node; the at least one relaying node establishing a connection to each of the plurality of recipients; transmitting the data stream from the source to the at least one relaying node; and transmitting the data stream from the at least one relaying node to the plurality of recipients.

20 Claims, 7 Drawing Sheets

(51) Int. Cl.
*H04L 12/18* (2006.01)
*H04L 29/08* (2006.01)

(56) References Cited

U.S. PATENT DOCUMENTS

| | | |
|---|---|---|
| 7,113,998 B1 | 9/2006 | Stern et al. |
| 7,289,453 B2 | 10/2007 | Riedel et al. |
| 7,593,376 B2 | 9/2009 | D'Amico et al. |
| 7,702,923 B2 | 4/2010 | Weik et al. |
| 8,204,955 B2 | 6/2012 | McBride et al. |
| 8,363,661 B2 | 1/2013 | Hiie et al. |
| 8,416,776 B2 * | 4/2013 | Lim et al. ............ 370/390 |
| 8,478,893 B2 | 7/2013 | Hiie |
| 2002/0004796 A1 | 1/2002 | Vange et al. |
| 2002/0194108 A1 | 12/2002 | Kitze |
| 2003/0112766 A1 | 6/2003 | Riedel et al. |
| 2003/0158958 A1 | 8/2003 | Chiu |
| 2005/0240591 A1 | 10/2005 | Marceau et al. |
| 2006/0140123 A1 * | 6/2006 | Conner et al. ........ 370/238 |
| 2007/0127421 A1 | 6/2007 | D'Amico et al. |
| 2007/0171274 A1 * | 7/2007 | Yim .................... 348/14.08 |
| 2007/0280172 A1 | 12/2007 | Tan et al. |
| 2009/0125582 A1 | 5/2009 | Marcus |
| 2009/0307760 A1 | 12/2009 | Yoshimura |
| 2010/0011435 A1 | 1/2010 | Wee et al. |
| 2010/0153496 A1 | 6/2010 | Heinla |
| 2010/0182916 A1 | 7/2010 | Drewes et al. |
| 2010/0227620 A1 | 9/2010 | Naden et al. |
| 2010/0260190 A1 | 10/2010 | Hiie et al. |
| 2010/0262714 A1 | 10/2010 | Hiie |
| 2011/0064079 A1 * | 3/2011 | Lim et al. ............ 370/390 |
| 2013/0142108 A1 * | 6/2013 | Ji et al. ............... 370/315 |

FOREIGN PATENT DOCUMENTS

| | | |
|---|---|---|
| WO | WO-03046736 | 6/2003 |
| WO | WO-2005009019 | 1/2005 |
| WO | WO-2005046148 | 5/2005 |
| WO | 2007081649 A2 | 7/2007 |
| WO | WO-2010119026 | 10/2010 |

OTHER PUBLICATIONS

"International Search Report and Written Opinion", Application No. PCT/EP2010/054805, (Oct. 5, 2010), 13 pages.

"Non Final Office Action", U.S. Appl. No. 12/660,062, (Jan. 5, 2012), 19 pages.

"Non-Final Office Action", U.S. Appl. No. 12/660,062, (Jun. 6, 2012), 18 pages.

"Non-Final Office Action", U.S. Appl. No. 12/660,082, (Aug. 23, 2012), 19 pages.

"Notice of Allowance", U.S. Appl. No. 12/660,062, (Sep. 25, 2012), 12 pages.

"Search Report under Section 17", Application No. 0906413.0, (Jul. 14, 2009), 1 page.

"Search Report under Section 17", Application No. 0906414.8, (Aug. 3, 2009), 1 page.

Guo, Yu-Hsuang et al., "Trickle: Resilient Real-Time Video Multicasting for Dynamic Peers with Limited or Asymmetric Network Connectivity", *IEEE Eighth International Symposium on Multimedia*, (2006), 8 pages.

"Examination Report", GB Application No. 0906413.0, Jan. 14, 2015, 2 pages.

"Office Action Issued in United Kingdom Patent Application No. 0906413.0", Mailed Date: Jul. 24, 2014, 2 Pages (MS# 335465.01).

* cited by examiner

METHOD AND SYSTEM FOR DATA TRANSMISSION

RELATED APPLICATIONS

This application is a continuation of and claims priority under 35 U.S.C. §120 to U.S. patent application Ser. No. 12/660,062 titled "Method and System for Data Transmission" and filed Feb. 19, 2010, which claims priority under 35 U.S.C. §119 or 365 to GB Application No. 0906413.0, filed Apr. 14, 2009, the disclosures of which are incorporated herein by reference in their entirety.

FIELD OF THE INVENTION

This invention relates to a method and system for data transmission.

BACKGROUND

Packet-based communication systems allow the user of a device, such as a personal computer, to communicate across a computer network such as the internet. Packet-based communication systems provide features to the user such as voice over internet protocol ("VoIP") calling, video calling, file transfer, instant messaging ("IM"), and voicemail. These systems are beneficial to the user as they are often of significantly lower cost than fixed line or mobile networks. This may particularly be the case for long-distance communication. To use a packet-based communication system, the user must install and execute communication client software on their user terminal. The communication client software enables the connections as well as other functions such as registration and authentication.

One type of packet-based communication system uses a peer-to-peer ("P2P") overlay network topology operating on the internet. To enable access to a peer-to-peer system, the user must execute P2P client software provided by a P2P software provider on their user terminal, and register with the P2P system. When the user registers with the P2P system the client software is provided with a digital certificate from a server. Once the client software has been provided with the certificate, communication can subsequently be set-up and routed between user terminals of the P2P system without the further use of a server. The network address of a destination user terminal can be found by the client software accessing a P2P database distributed across other user terminals of the P2P system. Once the network address of the destination user terminal is known, the calling user terminal can exchange of one or more digital certificates with the destination user terminal. The exchange of the digital certificates between the user terminals provides proof of the users' identities and that they are suitably authorised and authenticated in the P2P system. Therefore, the presentation of digital certificates provides trust in the identity of the user. It is therefore a characteristic of peer-to-peer communication that the communication can be established and proceeds without using a server, by operating from end-user terminal to end-user terminal with support provided by other end-user terminals of the P2P system. Further details on such a P2P system are disclosed in WO 2005/009019.

A problem with packet-based communication systems is that they are not well optimised for the delivery of data (in the form of, for example, video or voice calls or file transfers) to groups of user terminals. Typically, packet-based communication systems operate by establishing multiple one-to-one connections directly with each of the user terminals in the group. This gives rise to significant resource demands at the source user terminal, in terms of available bandwidth and processing.

There is therefore a need for a technique to address the aforementioned problems with the distribution of data to groups of user terminals in a packet-based communication system.

SUMMARY

According to one aspect of the present invention there is provided a method of transmitting a data stream in a network of interconnectable end-user nodes comprising a source node, a plurality of recipient nodes and a plurality of further nodes, wherein each of the end-user nodes is executing an instance of a communication client application, the method comprising: the communication client application of the source node receiving a command to transmit the data stream to the plurality of recipient nodes; selecting from the plurality of further nodes at least one relaying node to relay the data stream between the source node and the plurality of recipient nodes; the communication client application at the source node establishing a connection to the at least one relaying node; the communication client application at the at least one relaying node establishing a connection to each recipient node of the plurality of recipient nodes; transmitting the data stream from the source node to the at least one relaying node; and transmitting the data stream from the at least one relaying node to the plurality of recipient nodes.

Because the at least one relaying node establishes the multiple connections to the plurality of recipient nodes, i.e. it establishes one connection to each of the recipient nodes, the source node does not need to be able to support a connection to each of the recipient nodes. Instead the source node only needs to be able to support a connection to the at least one relaying node. This enables the data stream to be transmitted to the plurality of recipient nodes even if the source node does not have the necessary resources available to support connections to each of the recipient nodes. This allows the data stream to be received at the plurality of recipient nodes with an acceptable bit-rate, despite a limited resource situation at the source node.

In embodiments, the at least one relaying node may not read the content of the data stream.

Furthermore, the plurality of recipient nodes and the plurality of further nodes may be mutually exclusive.

Because the further nodes preferably do not read the content of the data stream, and are not recipient nodes, they act as non-participant "helper" nodes to enable the delivery of the data stream to the recipient nodes. As the further nodes are also end-user nodes in the network, they enable the delivery of the data stream without requiring further network infrastructure.

In embodiments, the step of selecting may comprise: determining available resources at the plurality of further nodes and selecting the at least one relaying node in dependence on the available resources.

Because the selection of the relaying node is preferably based on the available resources at the further nodes, one or more relaying nodes can be selected which have the necessary resources to be able to deliver the data stream to the recipient nodes. This ensures that at least one suitable relaying node is selected before the connection is established.

In further embodiments, the step of selecting the at least one relaying node in dependence on the available resources may comprise: analysing whether one of the plurality of further nodes has sufficient available resources to support the transmission of the data stream to the plurality of the recipient nodes.

In the case that one of the plurality of further nodes has sufficient available resources, the method may comprise selecting the one further node to be the at least one relaying node.

The step of selecting the at least one relaying node in dependence on the available resources may comprise: in the case that one of the plurality of further nodes does not have sufficient available resources, analysing whether a combination of two or more further nodes has sufficient available resources when combined to support the transmission of the data stream to the plurality of the recipient nodes.

In the case that the combination of two or more further nodes have sufficient available resources when combined, the method may comprise selecting the two or more further nodes to be the at least one relaying node.

The step of selecting may therefore be performed in stages, such that it is first determined whether a single one of the further nodes is able to support all the connections to the plurality of recipient nodes on its own. Using the fewest possible relaying nodes is advantageous in terms of computational load and delay. If this is not possible, then a combination of relaying nodes are selected that, when acting together, have enough resources to send the data stream to all of the recipient nodes. This therefore enables the data stream to be sent to all of the recipient nodes even if no individual further node has sufficient resources to support the transmission on its own.

The method may further comprise the step of the communication client application of the source node generating a plurality of data blocks from the data stream, wherein the step of transmitting the data stream from the source node may comprise transmitting at least one block to each of the two or more further nodes.

The step of transmitting may comprise alternately transmitting respective packets of the data stream via each of the two or more further nodes.

The available resources at the plurality of further nodes may comprise at least one of: an available uplink bandwidth; available processing resources; an available downlink bandwidth; and connectivity conditions.

The step of the communication client application at the source node establishing a connection to the at least one relaying node may comprise: establishing a connection between the source node and the at least one relaying node via at least one further relaying node selected from the plurality of further nodes, and the step of transmitting the data stream from the source node to the at least one relaying node may comprise: transmitting the data stream from the source node to the at least one relaying node via the at least one further relaying node.

The method may further comprise the step of: prior to selecting from the plurality of further nodes at least one relaying node, determining whether sufficient resources are available at the source node or the plurality of recipient nodes to support the transmission of the data stream without utilising the further nodes.

The data stream may comprise at least one of: video data; voice data and computer-readable file data.

The network of interconnectable end-user nodes may be an overlay network operating on the internet. The overlay network may be a peer-to-peer overlay network.

According to another aspect of the present invention, there is provided a communication client programme product comprising programme code means which when executed on an end-user node in a network of interconnectable end-user nodes is arranged operate in conjunction with like communication client programmes running on other end-user nodes of the network to perform the steps of any of the above methods.

According to another aspect of the invention, there is provided a system for transmitting a data stream in a network of interconnectable end-user nodes, wherein each of the end-user nodes is executing an instance of a communication client application, the system comprising: a source node; a plurality of recipient nodes; a plurality of further nodes; and means for selecting from the plurality of further nodes at least one relaying node to relay the data stream between the source node and the plurality of recipient nodes; wherein the communication client application of the source node is arranged to receive a command to transmit the data stream to the plurality of recipient nodes, establish a connection to the at least one relaying node, and transmit the data stream from the source node to the at least one relaying node; and wherein the communication client application at the at least one relaying node is arranged to establish a connection to each recipient node of the plurality of recipient nodes, and transmit the data stream from the at least one relaying node to the plurality of recipient nodes.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Figure 1:
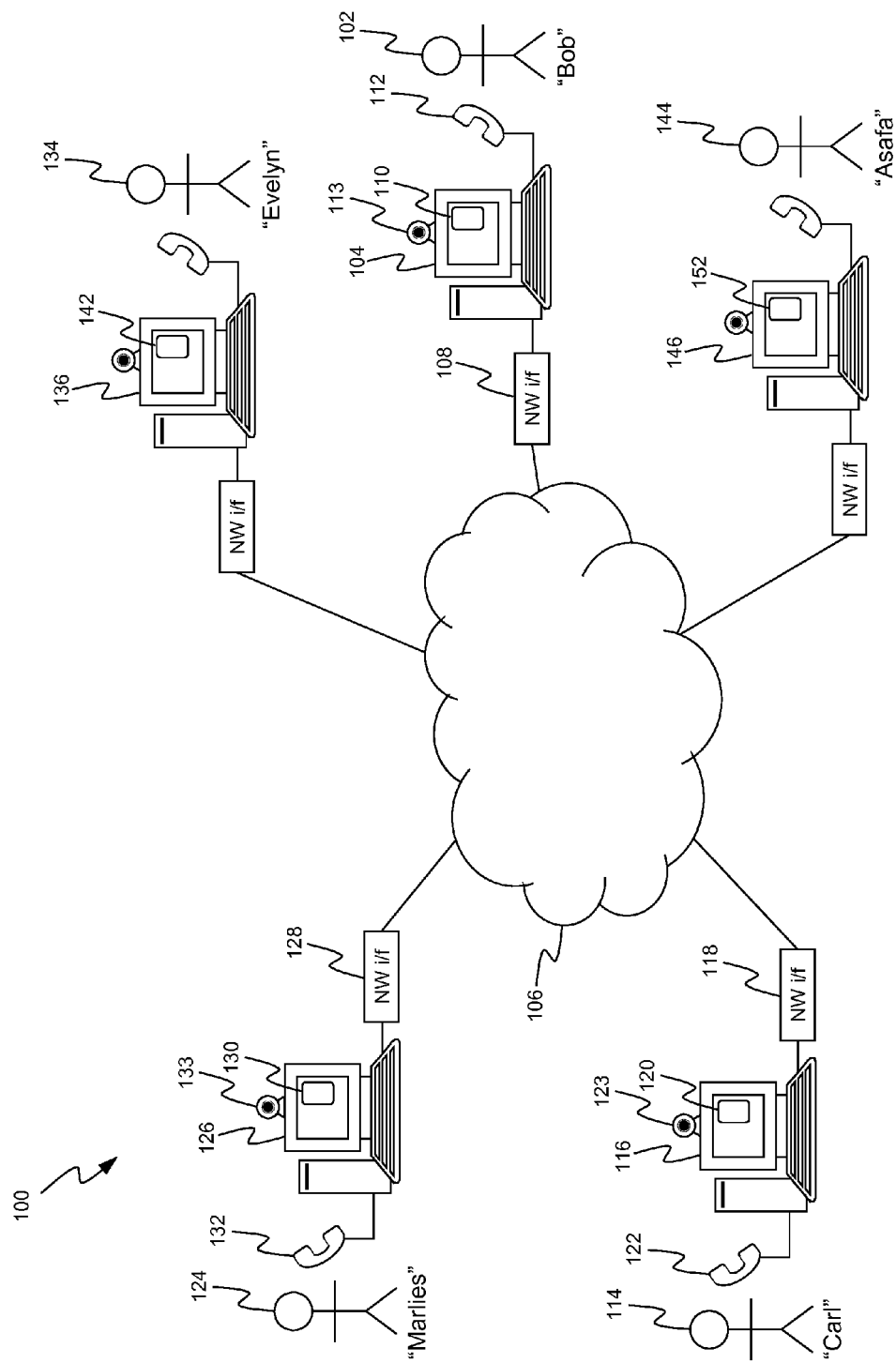
FIG. 1 shows a packet-based communication system.

Reference is first made to FIG. 1, which illustrates a packet-based communication system 100. Note that whilst this illustrative embodiment is described with reference to a P2P overlay network, other types of communication system could also be used, such as non-P2P, VoIP, IM or file transfer systems. A first user 102 of the communication system (named "Bob") operates a user terminal 104 which is able to connect to a network 106 such as the Internet. The user terminal 104 may be, for example, a personal computer ("PC") (including, for example, Windows™, Mac OS™ and Linux™ PCs), a personal digital assistant ("PDA"), a mobile phone, a gaming device or other embedded device able to connect to the network 106. The user terminal 104 is arranged to receive information from and output information to the user 102 of the device. Preferably, the user device comprises a display such as a screen and an input device such as a keyboard, mouse, joystick and/or touch-screen. The user device 104 is connected to the network 106 via a network interface 108 such as a modem, and the connection between the user terminal 104 and the network interface 108 can be via a cable (wired) connection or a wireless connection. Note that in alternative embodiments, the user terminal 104 can connect to the communication network 106 via additional intermediate networks not shown in FIG. 1.

The user terminal 104 is running a communication client 110, provided by the packed-based communication system software provider. The communication client 110 is an application layer software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 104, or integrated into the user terminal 104 itself. The user terminal 104 is further connected to a webcam 113 for providing video data, for example for use in video calls.

Figure 2:
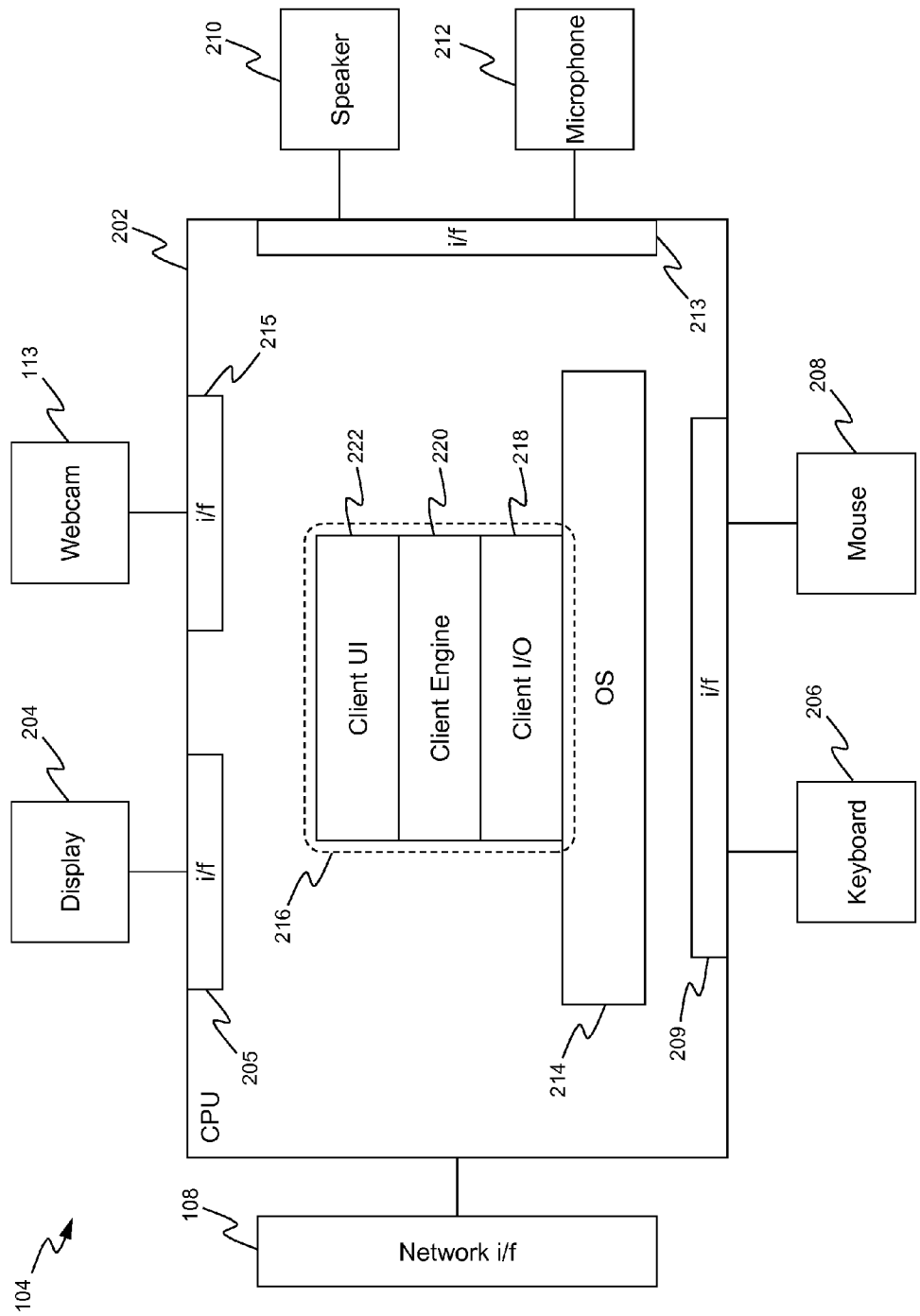
FIG. 2 shows the structure of a user terminal in the packet-based communication system.

FIG. 2 illustrates a detailed view of the user terminal 104 on which is executed client 110. The user terminal 104 comprises a central processing unit ("CPU") 202, to which is connected a display 204 such as a screen via a display interface 205, an input device such as a keyboard 206 and a pointing device such as a mouse 208 connected via an interface 209 such as USB. In alternative terminals, the input devices and pointing device can be integrated into the terminal, such as a keypad, touch-screen and/or joystick. An output audio device 210 (e.g. a speaker) and an input audio device 212 (e.g. a microphone) are connected via an audio interface 213. The output audio device 210 and input audio device 212 may be integrated into a handset 112 or headset, or may be separate. The CPU 202 is connected to the network interface 108. The CPU 202 is also connected to the webcam 113 via interface 215, for use in video calls.

FIG. 2 also illustrates an operating system ("OS") 214 executed on the CPU 202. Running on top of the OS 214 is a software stack 216 for the client 110. The software stack shows a client I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network via the network interface 108. With reference to the TCP/IP model, the operating system implements the transport, internet, and (optionally) a portion of the link layer, with the remainder of the link layer being implemented in firmware at the user terminal 104. The communication client 110 operates at the application layer. The client I/O layer 218 of the client software communicates with the operating system 214 and handles voice and video coding and manages the signalling and data connections over the communication system. Higher level functionality is provided by the client engine layer 220, including, for example, handling presence, relaying, user address look-up and authentication. The client engine 220 also communicates with the client user interface layer 222. The client engine 220 may be arranged to control the client user interface layer 222 to present information to the user via the user interface of the client (as shown in FIG. 2) and to receive information from the user via the user interface.

Figure 3:
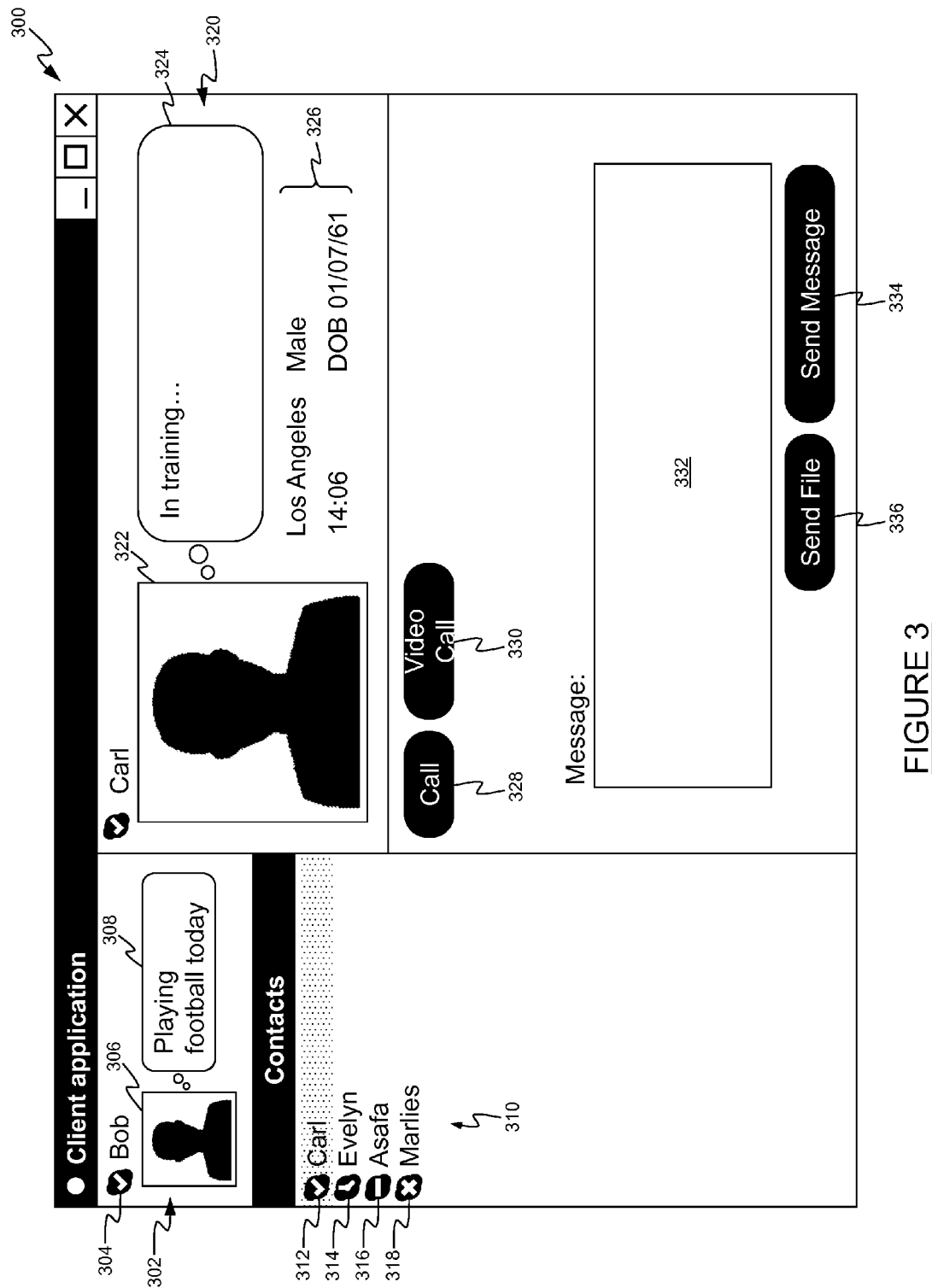
FIG. 3 shows a user interface of a communication client in the packet-based communication system.

An example of a user interface 300 of the communication client 110 executed on the user terminal 104 of the first user 102 is shown illustrated in FIG. 3. Note that the user interface 300 can be different depending on the type of user terminal 104. For example, the user interface can be smaller or display information differently on a mobile device, due to the small screen size. In the example of FIG. 3, the client user interface 300 displays user information 302 for "Bob" 102 in the communication system. This shows the user-defined presence state icon 304 (that will be seen by other users), the user's avatar 306 and mood message 308.

The client user interface 300 comprises a contact list 310 showing the contacts stored by the user 102. In the example user interface in FIG. 3, four contacts of other users of the communication system are shown listed in contact list 310. Each contact in the contact list has a name and a presence state chosen by the contact associated with it, and each of these contacts have authorised the user of the client to view their contact details and the contact-defined presence information. For example, the presence status icon for "Carl" 312 indicates that this contact is "online", the presence icon for "Evelyn" 314 indicates that this contact is "away", the presence icon for "Asafa" 316 indicates that this contact's state is "do not disturb" ("DND"), the presence icon for "Marlies" 318 indicates that this contact is "offline". Further presence state indications can also be included.

When a contact in the contact list 310 is selected (for example "Carl"), then corresponding profile information 320 is displayed for this contact. The profile information includes, for example, the contact's avatar 322, mood message 324 and personal details 326.

VoIP calls to the selected user in the contact list 310 can be initiated over the communication system by selecting the contact and clicking on a "call" button 328 using a pointing device such as a mouse. Similarly, a video call can be initiated by selecting the contact and clicking on a "video call" button 330. In addition to making real-time calls (voice or video), the user of the client 110 can also communicate with the users listed in the contact list 310 in several other ways. For example, the user 102 can type an IM message in the message field 332, and send the IM message to the selected contact using the "send message" button 334. Furthermore, the user 102 can use the client 110 to transmit documents or files to users in the contact list 310, by selecting a contact and clicking on the "send file" button 336.

The process for establishing a connection between user terminals is similar for each of the above-mentioned types of communication (i.e. calls, messages or file transfer). The connection set-up is performed using proprietary protocols, and is established over the network 106 between the calling user and called user by the peer-to-peer system without the use of central servers.

Described below is an illustrative example of the communication process in which the calling user "Bob" 102 establishes a voice call with a second user "Carl" 114. The process is similar for e.g. video calls and file transfer.

After looking-up the network address of the called user terminal in a distributed P2P database, and following authentication through the presentation of digital certificates (to prove that the users are genuine subscribers of the communication system—described in more detail in WO 2005/009019), the call can be made using VoIP. The client 110 performs the encoding and packetisation voice data into VoIP packets. VoIP packets from the user terminal 104 are transmitted into the network 106, and routed to a user terminal 116 of the called party 114, via a network interface 118. A client 120 (similar to the client 110) running on the user terminal 116 of the called user 114 decodes the VoIP packets to produce an audio signal that can be heard by the called user using the handset 122. Conversely, when the second user 114 talks into handset 122, the client 120 executed on user terminal 116 encodes the audio signals into VoIP packets and transmits them across the network 106 to the user terminal 104. The client 110 executed on user terminal 104 decodes the VoIP packets, and produces an audio signal that can be heard by the user of the handset 112. Similarly, video data can be captured by a webcam 123, encoded by the client 120 and transmitted to the user terminal 104.

Due to the P2P nature of the system illustrated in FIG. 1, the actual calls between users of the communication system can be made with no central servers being used. This has the advantages that the network scales easily and maintains a high voice quality, and the call can be made free to the users.

In the case of one-to-one communication, such as outlined above, the demands on the network and CPU resources are not excessive, as the data is simply sent over a single communications link between the user terminals. However, it is desirable to offer one-to-many communications between the users of the packet-based communication system. One-to-many communications give rise to significant problems, particularly in terms of resource availability and management.

For example, consider, with reference to FIG. 1, the following multi-party communication scenario. User "Bob" 102 wishes to send a data stream (for example video data or a file transfer) to multiple participants. In this scenario, the desired recipients of the data stream are the user "Carl" 114 and user "Marlies" 124 (operating a user terminal 126 connected via network interface 128, executing client application 130 and connected to handset 132 and webcam 133).

Figure 4A:
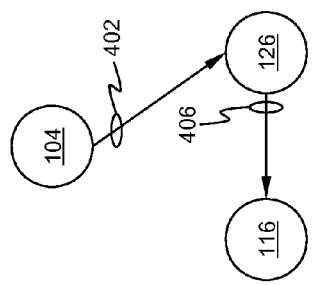
FIG. 4A-4C shows examples of group communication scenarios without the use of non-participant relay nodes.

The simplest method for sending the data stream to the two recipients is to set up two simultaneous one-to-one links from the transmitting user terminal 104 (called the "publisher" user terminal) to each of the recipient user terminals (116, 126) (called the "consumer" user terminals). This is illustrated in FIG. 4A. However, establishing a plurality of one-to-one links in this manner can be inefficient in terms of network resource usage, and rapidly becomes unfeasible as more users are added to the multi-party communication. Resources such as uplink bandwidth 402 and CPU load at the publisher user terminal 104 rapidly reach capacity if many one-to-one links are established.

If, for example, the publisher user terminal 104 only has sufficient available uplink bandwidth to send the data stream to one other user terminal, then it is clearly not possible to establish one-to-one links to both of the consumer user terminals. This problem can be solved through the use of relay nodes.

Figure 4B:
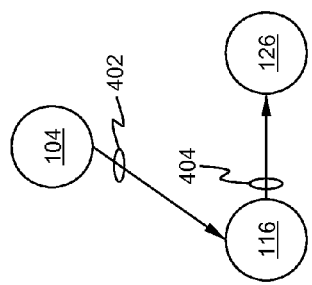
Figure 4C:
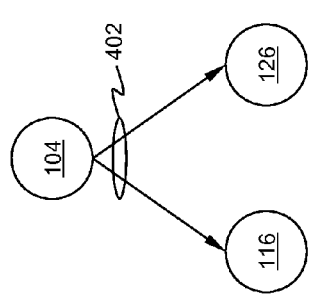

This is illustrated in FIGS. 4B and 4C, where user terminal 104 only has enough available uplink bandwidth 402 to support one connection.

In FIG. 4B, a first connection is established between the publisher user terminal 104 and the first consumer user terminal 116. A second connection is established between the first consumer user terminal 116 and the second consumer user terminal 126. The first consumer user terminal 116 relays the data provided by the publisher user terminal 104 to the second consumer user terminal 126. By using one of the consumer user terminals as a relay node, only a single connection is needed from the publisher user terminal 104, and hence the capacity of the uplink bandwidth 402 is not exceeded. Therefore, the data stream can be sent to all consumer user terminals, whilst utilising the available resources efficiently.

Similarly, in FIG. 4C, a first connection is established between the publisher user terminal 104 and the second consumer user terminal 126. A second connection is established between the second consumer user terminal 126 and the first consumer user terminal 116. The second consumer user terminal 126 relays the data provided by the publisher user terminal 104 to the first consumer user terminal 116. Again, by using one of the consumer user terminals as a relay node, only a single connection is needed from the publisher user terminal 104, and the capacity of the uplink bandwidth 402 is not exceeded.

The examples in FIGS. 4B and 4C show the use of relay nodes that are also consumers of the data stream themselves (called participant relay nodes). The use of such relay nodes can therefore enable the data stream to be efficiently distributed to the consumer user terminals. The particular node selected to perform the relaying can be chosen on the basis of the available resources (such as available CPU power and uplink bandwidth) at the consumer user terminals.

However, a problem that can arise with the use of participant relay nodes, such as illustrated in FIGS. 4B and 4C is that the consumer user terminals that are used to relay the data stream must have sufficient resources available in order to perform the relaying operation. For example, with reference to FIG. 4B consumer user terminal 116 must have sufficient CPU resources and uplink bandwidth (404, 406) available to relay the data stream to the consumer 126. This can be particularly problematic because the relaying node 116 is consuming the data stream at the same time as relaying it. Therefore, the CPU usage can already be high due to the decoding and display of the content of the data stream, and the uplink bandwidth can be used if the data stream relates to two-way content (e.g. in a multi-party video call). Hence, in some cases, participant relay nodes are not feasible due to a lack of resources at the consumer user terminal.

Figure 5:
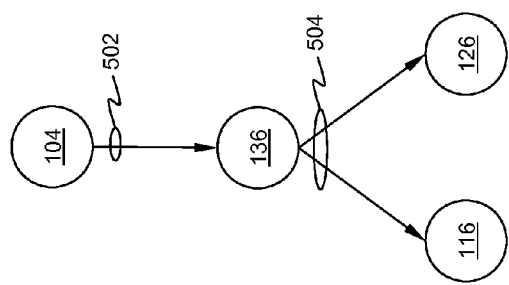
FIG. 5 shows an example of group communication using a single non-participant relay node.

These problems can be solved through the use of non-participant relay nodes, as illustrated in FIG. 5. A non-participant relay node is a node selected to act as a relay in order to assist in the delivery of a data stream to a group of consumer user terminals when there is otherwise insufficient resources available to support the transmission of the data stream. A non-participant relay node is not a consumer of the data stream, i.e. the non-participant relay node does not read the content of the data stream. Therefore, the non-participant relay node acts simply as a "helper" node to enable the distribution of the data stream.

Note that the non-participant relay nodes are other user terminals of users of the packet-based communication system which are executing the communication client application.

For example, with reference to FIG. 1, in the illustrative case of publisher user terminal 104 sending a data stream to consumer user terminals 116 and 126, then other user terminals in the system 100 can be selected to act as non-participant relay nodes. In the example of FIG. 1, a user terminal 136 executing client application 140 and operated by user "Evelyn" 138, and user terminal 146 executing client application 150 and operated by user "Asafa" 144 can act as non-participant relay nodes.

The advantages of using non-participant relay nodes are illustrated with reference to FIG. 5. In this example, publishing user terminal 104 only has sufficient resources (e.g. uplink bandwidth 502 or CPU power) to transmit the data stream over a single connection. Furthermore, consumer user terminals 116 and 126 do not have sufficient available resources to act as participant relay nodes (as in FIGS. 4B and 4C). Therefore, a non-participant user terminal is selected (in this case user terminal 136) to act as a relay node. This non-participant relay node is selected because is has sufficient available resources (e.g. uplink bandwidth 504 and CPU power) to establish a connection to both of the consumer user terminals (116, 126). In other words, the relay node has the resources available to be able to distribute the data stream to a plurality of consumer user terminals.

This is advantageous because even though the uplink bandwidth 502 at the publisher user terminal 104 and consumer user terminals (116, 126) might be limited, the data stream can still be sent to the two consumer user terminals (116, 126).

As a simplified numerical example, consider a data stream requiring a bit rate of 100 Kbps. To support direct connections to the consumer user terminals (as in FIG. 4A) an available uplink bandwidth 402 of at least 200 Kbps is needed at the publisher user terminal 104 (to support two connections, each of 100 Kbs). If participant relay nodes are used (as in FIGS. 4B and 4C), then an available uplink bandwidth 402 of only 100 Kbps is required at the publisher node 104 is needed, but an available uplink bandwidth of 100 Kbps is required at the participant relay node (404 in FIG. 4B, 406 in FIG. 4C).

If a non-participant relay node is used (as in FIG. 5), then an available uplink bandwidth 502 of only 100 Kbps is required at the publisher node 104 is needed, and no requirements are placed on the consumer user terminal uplinks. However, the non-participant relay node 136 requires an available uplink bandwidth 504 of at least 200 Kbps to support the multiple connections to the consumer user terminals (116, 126).

This illustrates a further problem that arises with relay nodes. As the number of consumer user terminals increases, then the demands on the resources of the non-participant relay nodes also increases accordingly. For example, if there were ten consumer user terminals, then the non-participant relay node 136 would need an available uplink bandwidth of at least 1000 Kpbs. It therefore becomes less and less likely that a single non-participant relay node can be found that has sufficient resources available.

Figure 6:
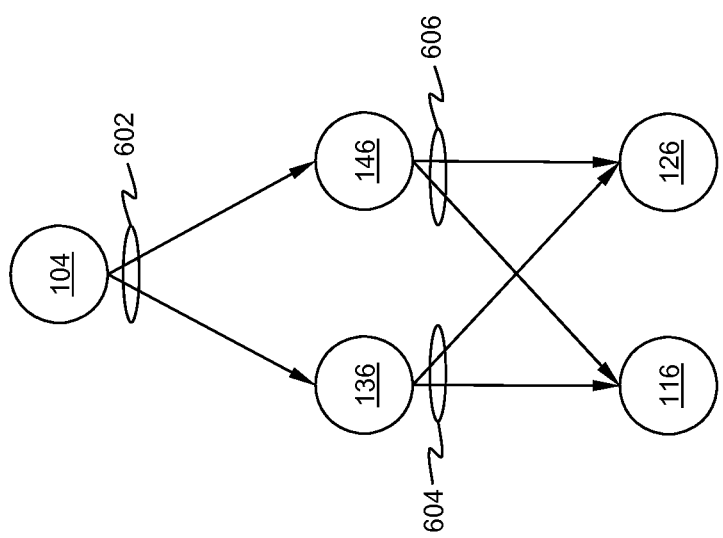
FIG. 6 shows an example of group communication using two non-participant relay nodes.

This problem can be solved by using multiple non-participant relay nodes, as illustrated in FIG. 6. In order to reduce the resource demands, multiple non-participant relay nodes (136 and 146) can be selected, and the data stream shared between the two relay nodes.

The sharing of the transmitted data over the two relays (136, 146) can be done in a number of different ways. Preferably, the data is interleaved between the two relays, such that alternate packets are sent via each relay. This then operates such that a first packet of data is sent via the first relay, a second packet of data is sent via the second relay, a third packet of data is sent via the first relay, a fourth packet of data is sent via the second relay, and so on. In alternative embodiments, the division of the data between the relays can be based not on packets, but on other factors such as speech or video frames from a codec (i.e. alternate frames are sent via each relay). A further alternative method of sharing the data, which can be used for file transfers, is to divide the overall file into two contiguous portions, and send each portion via one relay.

The sharing of data can also be based on the relative capabilities or resources of the relay nodes. For example if the first relay node 136 has lower resources than the second relay node 146, then a corresponding proportion of the data can be sent via each of the respective relays.

The use of multiple non-participant relay nodes is advantageous because it enables the data stream to be sent to the consumer user terminals even if there is not a single relay node available that has sufficient resources to support the data stream, without increasing the resource demands on the publisher user terminal.

The operation of FIG. 6 is most easily illustrated with a simplified numerical example. Consider the case that a data stream is to be sent that requires 100 Kbps. The publisher user terminal 104 therefore needs an available uplink bandwidth 602 of at least 100 Kbps. Assuming that there is 100 Kbps available at the publisher uplink 602, then the data can be interleaved between the two non-participant relay nodes (136, 146) such that each one receives data at 50 Kbps (i.e. two links sharing the 100 Kbps available uplink). It should therefore be noted that no more overall uplink bandwidth is required at the publisher user terminal 104 than in the example shown in FIG. 5, even though two links are established.

Each non-participant relay node (136, 146) sends the data it receives to both of the consumer user terminals (116, 126). Hence, two links are established from each non-participant relay node (136, 146), each of which transmits data at 50 Kbps. As a result of this, each consumer user terminal (116, 126) receives the two interleaved 50 Kbps data streams, which are reassembled into the original 100 Kbps data stream. This is achieved with an uplink (604, 606) resource requirement of at least 100 Kbps at the non-participant relay nodes (i.e. uplink bandwidth for two 50 Kbps links).

Therefore, by using multiple non-participant relay nodes (136, 146), the uplink requirements at the relay nodes have been reduced from 200 Kbps (in FIG. 5) to 100 Kbps (in FIG. 6). Hence, if a single non-participant relay node was not available that had an available uplink bandwidth of 200 Kbps, then two non-participant relay nodes can be used if they have an available uplink bandwidth of 100 Kbps.

Figure 7:
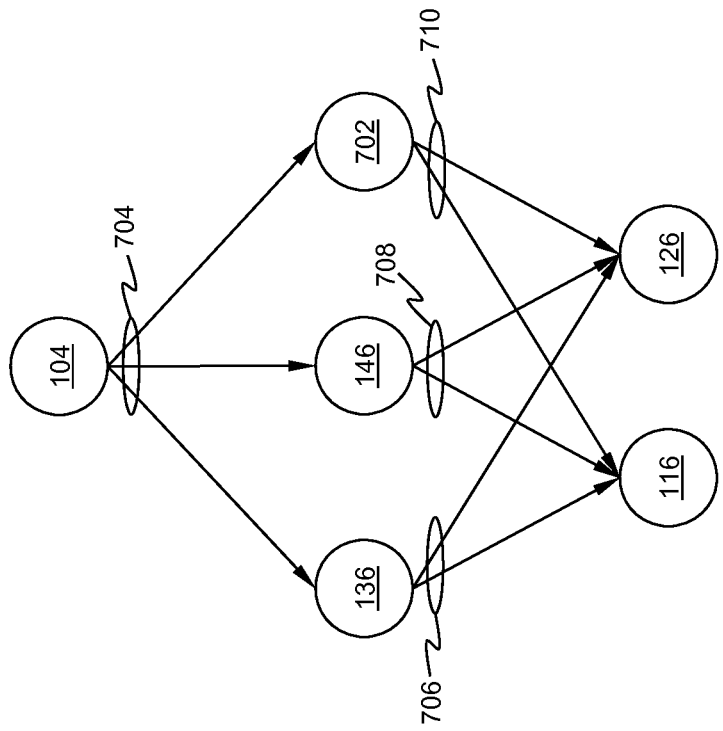
FIG. 7 shows an example of group communication using three non-participant relay nodes.

This principle extends further, as illustrated in FIG. 7 where three non-participant relay nodes (136, 146, 702) are used. The same logic applies as outlined above, except in this example the data stream is interleaved from the publisher user terminal 104 over three links (i.e. at a rate of 33.33 Kbps if a 100 Kbps uplink bandwidth 704 is available). Each of the three non-participant relay nodes (136, 146, 702) sends the data stream over two links to the consumer user terminals (116, 126) at 33.33 Kbps, thereby requiring an available uplink bandwidth at the non-participant relay nodes (136, 146, 702) of 66.66 Kbps.

As a result of this technique, any number of consumer user terminals can be supported, provided that there are enough non-participant relay nodes available to help in the delivery of the data stream. In practice, of course, some overhead is incurred in terms of processing to share the data stream at the publisher user terminal, and to reassemble the data stream at the consumer user terminals, and the numerical examples given above are a simplification. Nevertheless, a rough approximation for the required uplink bandwidth for the non-participant relay nodes required can be found as:

$$\text{Uplink bandwidth at relay} = \frac{\text{Uplink bandwidth at publisher} \times \text{Number of consumers}}{\text{Number of relays}}$$

This calculation only considers uplink bandwidth as the available resource. Further resources can also be considered, such as available CPU processing and available downlink bandwidth. Furthermore, this calculation assumes an equal distribution of the data between the non-participating relay nodes, which need not be the case if they have different amounts of resources available.

Figure 8:
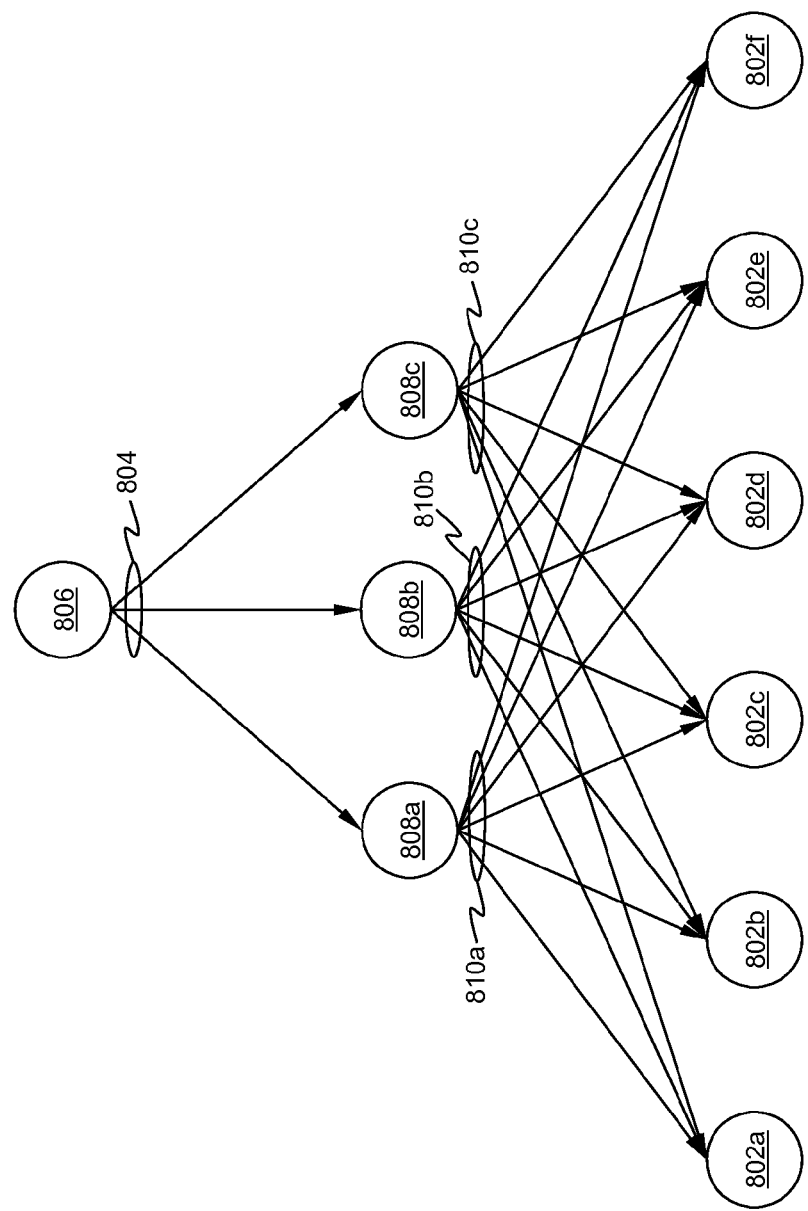
FIG. 8 shows an example of a group communication scenario using non-participant relay nodes.

FIG. 8 shows an example with a larger number of consumer user terminals. Applying the calculation above shows that to support six consumer user terminals (802*a-f*) with a data stream being sent at 100 Kbps at the uplink 804 of the publisher 806 requires an uplink bandwidth (810*a-c*) at each of the three non-participant relay nodes (808*a-c*) of 200 Kbps. This compares with a required uplink bandwidth of 600 Kbps if only a single relay is used.

Figure 9:
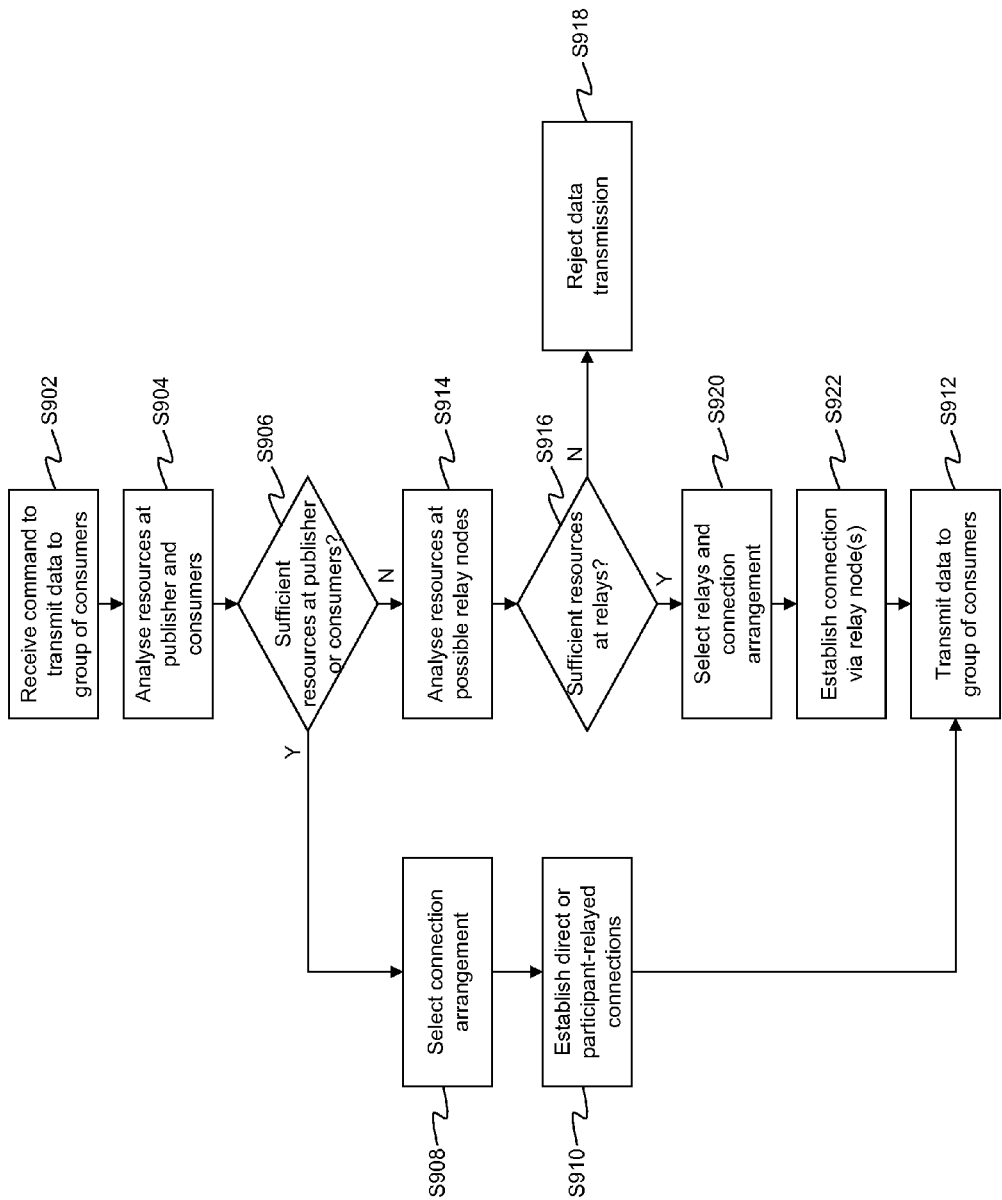
FIG. 9 shows a flowchart of a process for establishing group communication.

A flowchart showing a process for implementing the relaying schemes outlined above is illustrated with reference to FIG. 9.

In step S902 the communication client application 110 executed on the publisher user terminal 104 receives a command to transmit the data stream to the group of consumer user terminals (e.g. 116, 126). The command to transmit the data stream to the consumer user terminals can originate from a number of sources. This can originate from the user 102 selecting to initiate communication using the communication client 110 user interface (as shown in FIG. 3), for example by selecting one of the call or file transfer buttons (328, 330, 336). The command can also originate from the user 102 operating a hardware device connected to the user terminal 104, for example on the handset 112. Alternatively, the command can originate from another module within the communication client software 110, or from another application executed on the operating system 214 of the user terminal 104. Furthermore, the command can originate from outside the user terminal 104, and be communicated to the user terminal 104 via the network 106.

In step S904 the resource availability situation is evaluated at the publisher user terminal 104 and at the consumer user terminals (116, 126). The purpose of evaluating the available resources at these nodes is to determine whether a direct connection (as in FIG. 4A) between the publisher user terminal 104 and the consumer user terminals (116, 126) is feasible, or whether a relayed connection using participant relay nodes (as in FIGS. 4B and 4C) is feasible.

The resources that are analysed include (but are not limited to): the available uplink bandwidth at the publisher user terminal; the available CPU processing resources/power at the publisher user terminal; the available downlink bandwidth at the consumer user terminals; the available CPU processing resources/power at the consumer user terminals; and the available uplink bandwidth at the consumer user terminals. Further resources that can be analysed include an evaluation of the connectivity conditions, e.g. the firewall situation at the user terminals to determine whether any firewalls present allow connections to be readily established between user terminals. Firewalls can preclude the establishment of direct connections between user terminals, and in such cases the use of non-participant relay nodes is required.

In step S906, it is decided whether sufficient resources are present at the publisher user terminal 104 or consumer user terminals (116, 126) to support either direct connections or participant relayed connections. This is achieved by comparing the resource requirements of the data stream to the available resources in various configurations of user terminals. Preferably, a direct connection is used if this is feasible under the resource availability, as this uses no relay nodes, and hence has the lowest latency. If this is not possible, then combinations of participant relay nodes are assessed.

If it is decided in step S906 that either direct connections or participant-relayed connections are possible given the available resources, then in step S908 the arrangement of the user terminals and connections to enable the transmission of the data stream is selected (i.e. the selection of which user terminals connect to which other nodes, which ones act as relays, etc.) If several combinations of participant relay nodes are possible given the available resources, then the one which minimises the overall resource usage is selected.

The three steps of: analysing the available resources in step S904; deciding whether sufficient resources are available at the publisher user terminal 104 or consumer user terminals (116, 126) in step S906; and selecting the connection arrangement in step S908 can be performed by a number of different entities. Preferably, the resource situation of each of the consumer user terminals is reported to the publisher user terminal, and the publisher user terminal performs the analysis and makes the decision. Alternatively, a centralised optimisation algorithm can be sent all the data and be used to make the decision. Alternatively, the optimisation algorithm can be distributed among the user terminals involved in the transmission of the data stream.

In step S910 the appropriate connections between the user terminals are established in accordance with the selected arrangement. Once these connections are established, then in step S912 the publisher user terminal 104 can transmit the data stream to the consumer user terminals If, however, it is decided in step S906 that either direct connections or participant-relayed connections are not possible given the available resources, then in step S914 the resource situation at possible candidate non-participant relay nodes is analysed. The candidate non-participant relays that could be used are reported by an administrative node in the packet-based communication network (also called a "supernode"). The administrative node functionality is preferably implemented on another user terminal of the packet-based communication system (and hence not a central server). Alternatively, a centralised list of potential non-participant relay nodes can be maintained and used to obtain candidate relay nodes.

The purpose of analysing the resources at the candidate non-participant relay nodes in step S914 is to determine whether an arrangement such as that shown in FIG. 5, 6, 7 or 8 can be set up to deliver the data stream. The resources that are analysed include (but are not limited to): the available uplink bandwidth at the candidate non-participant relay nodes; the available CPU processing resources/power at the candidate non-participant relay nodes; the available downlink bandwidth at the candidate non-participant relay nodes. Further resources that can be analysed include an evaluation of the firewall situation at the candidate non-participant relay nodes. However, the presence of strong firewalls would preferably prevent a relay node being included in the list of candidate non-participant relay nodes.

In step S916, it is decided whether sufficient resources are available in the candidate non-participant relay nodes to support the transmission of the data stream to the consumer user terminals. This is achieved by comparing the resource requirements of the data stream to the available resources in various configurations of non-participant relay nodes.

If it is determined that there are not sufficient resources available at the candidate non-participant relay nodes to support the transmission of the data stream to the consumer user terminals in step S916, then in step S918 the transmission of the data stream to the consumer user terminals is aborted. This is because it has been determined that neither direct connections, participant relayed connection, nor non-participant relayed connections can support the desired transmission of the data stream. Alternatively, rather than aborting the transmission of the data stream, the required bit-rate of the data stream can be lowered, and transmission re-attempted.

If, however, it is determined that there are sufficient resources available at the candidate non-participant relay nodes to support the transmission of the data stream to the consumer user terminals in step S916, then in step S920 a connection arrangement is selected. In other words, a selection is made as to which of the candidate non-participant relay nodes should be used to relay the data stream, and what connections should be set up between the user terminals.

This selection can select a single non-participant relay node (as in FIG. 5) or a plurality of non-participant relay nodes (as in FIG. 6, 7 or 8). The step of selecting is performed in stages, such that it is first determined whether a single one of the further nodes is able to support all the connections to the plurality of recipient nodes on its own. Using the fewest possible non-participant relaying nodes is advantageous in terms of computational load and delay. If this is not possible, then a combination of relaying nodes are selected that, when acting together, have enough resources to send the data stream to all of the recipient nodes.

The selection can also result in a mix of direct connections and non-participant relayed connections, i.e. at least one consumer user terminal receives the data stream directly from the publisher, and the remainder of the group of consumer user terminals receive it via one or more non-participant relay nodes. Furthermore, non-participant relays can be selected to connect to other non-participant relays, if this is necessary to distribute the data stream with the available resources.

The selection that is made is decided on the basis of the configuration of user terminals and relay nodes that minimises the overall resource consumption when transmitting the data stream, whilst being feasible given the available resources.

As above, the three steps of: analysing the available resources in step S914; deciding whether sufficient resources are available at the publisher user terminal 104 or consumer user terminals (116, 126) in step S916; and selecting the relays and connection arrangement in step S920 can be performed by a number of different entities. Preferably, the resource situation of each of the candidate non-participant relay nodes is reported to the publisher user terminal, and the publisher user terminal performs the analysis and makes the decisions. Alternatively, a centralised optimisation algorithm can be sent all the data and be used to make the decision. Alternatively, the optimisation algorithm can be distributed among the user terminals involved in the transmission of the data stream.

In step S922 the appropriate connections between the user terminals are established in accordance with the selected arrangement. Once these connections are established, then in step S912 the publisher user terminal 104 can transmit the data stream to the consumer user terminals The above-described process therefore provides a technique whereby non-participant relay nodes can be used to provide a data stream to multiple consumer user terminals, in the case that the publisher user terminal is not able to deliver the data stream itself due to resource constraints. Instead the publisher user terminal only needs to be able to support a connection to the non-participant relay nodes. This solves the problem of providing one-to-many communication in a packet-based overlay communication system with limited resources.

While this invention has been particularly shown and described with reference to preferred embodiments, it will be understood to those skilled in the art that various changes in form and detail may be made without departing from the scope of the invention as defined by the appendant claims.

According to the invention in certain embodiments there is provided a system as herein described having the following features:

The at least one relaying node may not read the content of the data stream.

The plurality of recipient nodes and the plurality of further nodes may be mutually exclusive.

The means for selecting may be arranged to determine available resources at the plurality of further nodes and select the at least one relaying node in dependence on the available resources.

The means for selecting may be arranged to select the at least one relaying node in dependence on the available resources by analysing whether one of the plurality of further nodes has sufficient available resources to support the transmission of the data stream to the plurality of the recipient nodes.

In the case that one of the plurality of further nodes has sufficient available resources, the means for selecting may be arranged to select the one further node to be the at least one relaying node.

In the case that one of the plurality of further nodes does not have sufficient available resources, the means for selecting may be arranged to select the at least one relaying node in dependence on the available resources by analysing whether a combination of two or more further nodes has sufficient available resources when combined to support the transmission of the data stream to the plurality of the recipient nodes.

In the case that the combination of two or more further nodes have sufficient available resources when combined, the means for selecting may be arranged to select the two or more further nodes to be the at least one relaying node.

The communication client application of the source node may be further arranged to generate a plurality of data blocks from the data stream, and transmit the data stream from the source node by transmitting at least one block to each of the two or more further nodes.

The communication client application of the source node may be arranged to transmit the data stream from the source node by alternately transmitting respective packets of the data stream via each of the two or more further nodes.

The available resources at the plurality of further nodes may comprise at least one of: an available uplink bandwidth; available processing resources; an available downlink bandwidth; and connectivity conditions.

The communication client application at the source node may be arranged to establish a connection to the at least one relaying node by establishing a connection between the source node and the at least one relaying node via at least one further relaying node selected from the plurality of further nodes, and wherein the communication client application at the source node may be arranged to transmit the data stream from the source node to the at least one relaying node by transmitting the data stream from the source node to the at least one relaying node via the at least one further relaying node.

The means for selecting may be further arranged to determine whether sufficient resources are available at the source node or the plurality of recipient nodes to support the transmission of the data stream without utilising the further nodes, prior to selecting from the plurality of further nodes at least one relaying node.

The data stream may comprise at least one of: video data; voice data and computer-readable file data.

The network of interconnectable end-user nodes may be an overlay network operating on the internet.

The overlay network may be a peer-to-peer overlay network.

The invention claimed is:

1. A method of relaying a data stream for a group communication to multiple recipient nodes on behalf of a source node comprising:
receiving at a relaying node a command to operate as a relay to communicate the data stream to the recipient nodes on behalf of the source node, the relaying node being selected to operate as the relay based in part upon a determination regarding available resources at a plurality of potential relay nodes that includes an assessment of whether nodes of the plurality of potential relay nodes have sufficient resources to support transmission of the data stream individually or in combinations of two or more nodes, the relaying node configured to operate:
independent of other potential relay nodes responsive to a determination that the relaying node has sufficient resources to support transmission of the data stream; or;
in combination with one or more other potential relay nodes to communicate the data stream responsive to a determination that the relaying node does not have sufficient resources to support transmission of the data stream individually;
establishing by the relaying node multiple connections to enable the group communication, the multiple connections including a connection of the relaying node to each recipient node of the plurality of recipient nodes;
obtaining at the relaying node the data stream transmitted from the source node to the relaying node; and
transmitting by the relaying node the data stream to the multiple recipient nodes on behalf of the source node using the multiple connections.

2. A method according to claim 1, wherein the relaying node does not read the content of the data stream.

3. A method according to claim 1, wherein the multiple recipient nodes and the relaying node are mutually exclusive.

4. A method according to claim 1, further comprising: determining that the relaying node has sufficient resources to support transmission of the data stream individually and selecting the relaying node to operate individually as the relay responsive to the determination.

5. A method according to claim 1, further comprising: determining that the relaying node does not have sufficient resources to support transmission of the data stream individually and selecting the relaying node to operate in combination with one or more other potential relay nodes to communicate the data stream responsive to a determination.

6. A method according to claim 1, wherein the step of transmitting by the relaying node comprises alternately transmitting respective packets of the data stream in conjunction with at least one other relaying node.

7. A method according to claim 1, wherein the assessment of whether nodes of the plurality of potential relay nodes have sufficient resources to support transmission of the data stream includes determining one or more of available uplink bandwidth, available processing resources, available downlink bandwidth, or connectivity conditions associated with the plurality of potential relay nodes.

8. A method according to claim 1, wherein the data stream includes one or more of video data, voice data, or data files.

9. A method according to claim 1, wherein the data stream is associated with a voice over internet protocol (VOIP) call.

10. A method according to claim 1, wherein the source node, the relaying node, and the multiple recipient nodes are communicatively connected one to another in a peer-to-peer network.

11. A method according to claim 1, wherein the relaying node is a non-participant with respect to the group communication.

12. A computing device comprising:
communication hardware to enable communication with a plurality of nodes over a network;
a communication client application configured to perform operations to relay a data stream for a multi-party communication to multiple recipient nodes on behalf of a source node, the operations including:
receiving a command to operate as a relaying node in connection with one or more other relay nodes to communicate the data stream to the recipient nodes on behalf of the source node using multiple relay nodes, the computing device being selected to operate as the relaying node with the one or more other relay nodes based in part upon a determination regarding available resources at a plurality of potential relay nodes;
establishing multiple connections to enable the group communication, the multiple connections including a connection of the computing device to each recipient node of the plurality of recipient nodes;
obtaining the data stream transmitted from the source node to the computing device; and
transmitting the data stream to the multiple recipient nodes on behalf of the source node using the multiple connections and multiple relay nodes.

13. The computing device according to claim 12, wherein the computing device operating as the relaying node is a non-participant with respect to the multi-party communication.

14. The computing device according to claim 12, wherein the determination regarding available resources includes an assessment of whether nodes of the plurality of potential relay nodes have sufficient resources to support transmission of the data stream individually or in combinations of two or more nodes.

15. The computing device according to claim 12, wherein the network comprises a peer-to-peer network.

16. The computing device according to claim 12, wherein the multi-party communication comprises a multi-party video call over a computer network.

17. A communication application embodied on a computer readable storage device, the communication application executable by a computing device to perform operations to relay a data stream for a group communication to multiple recipient nodes on behalf of a source node including:
receiving a command to operate as a relaying node to communicate the data stream to the recipient nodes on behalf of the source node, the computing device being selected as the relaying node based in part upon a determination regarding available resources at a plurality of potential relay nodes, the command indicating whether to operate the relaying node individually or in combination with one or more other potential relay nodes for communication of the data stream in dependence upon the determination regarding available resources;
establishing multiple connections to enable the group communication, the multiple connections including a connection of the computing device to each recipient node of the plurality of recipient nodes;
obtaining the data stream transmitted from the source node to the computing device; and transmitting at least a portion of the data stream to the multiple recipient nodes on behalf of the source node using the multiple connections.

18. The communication application according to claim 17, wherein the group communication comprises two-way packet-based communication between the source node and the multiple recipient nodes.

19. The communication application according to claim 17, wherein the computing device is a non-participant with respect to the multi-party communication.

20. The communication application according to claim 17, wherein the determination regarding available resources includes an assessment of whether nodes of the plurality of potential relay nodes have sufficient resources to support transmission of the data stream individually or in combinations of two or more nodes.

* * * * *